US006064660A

United States Patent [19]
Cagney

[11] Patent Number: 6,064,660
[45] Date of Patent: May 16, 2000

[54] GSM TRANSCEIVER WITH PORTABLE PROTOCOL STACK

[75] Inventor: Francis Cagney, Munich, Germany

[73] Assignee: Optimay Corporation, Washington, D.C.

[21] Appl. No.: 08/766,583

[22] Filed: Dec. 12, 1996

[51] Int. Cl.⁷ .................................................. H04B 7/212
[52] U.S. Cl. .......................... 370/321; 370/337; 370/347
[58] Field of Search .................................. 370/321, 347, 370/337, 442, 469, 498, 467; 455/422, 435

[56]  References Cited

U.S. PATENT DOCUMENTS

| | | | |
|---|---|---|---|
| 4,637,022 | 1/1987 | Burke et al. ............................... | 371/31 |
| 4,768,150 | 8/1988 | Chang et al. ............................. | 364/300 |
| 4,855,905 | 8/1989 | Estrade et al. ........................... | 364/200 |
| 4,970,639 | 11/1990 | Diefendorf et al. ..................... | 364/200 |
| 5,003,470 | 3/1991 | Carpenter et al. ....................... | 364/200 |
| 5,067,104 | 11/1991 | Krishnakumar ......................... | 395/375 |
| 5,121,390 | 6/1992 | Farrell et al. ............................ | 370/94.1 |
| 5,187,708 | 2/1993 | Nakatani et al. ........................ | 370/85.1 |
| 5,265,252 | 11/1993 | Rawson, III et al. ................... | 395/700 |
| 5,278,834 | 1/1994 | Mazzola .................................. | 370/94.1 |
| 5,289,179 | 2/1994 | Beeson, Jr. et al. .................. | 340/825.5 |
| 5,289,469 | 2/1994 | Tanaka .................................... | 370/94.1 |
| 5,313,578 | 5/1994 | Handorf .................................. | 395/200 |
| 5,367,679 | 11/1994 | Khaira ..................................... | 395/650 |
| 5,373,507 | 12/1994 | Sköld ..................................... | 370/105.1 |
| 5,381,346 | 1/1995 | Monahan-Mitchell et al. ........ | 364/514 |
| 5,388,258 | 2/1995 | Larsson et al. .......................... | 395/600 |
| 5,390,216 | 2/1995 | Bilitza et al. ............................ | 375/106 |
| 5,394,547 | 2/1995 | Correnti et al. ......................... | 395/650 |
| 5,404,536 | 4/1995 | Ramakrishnan ........................ | 395/725 |
| 5,408,504 | 4/1995 | Ostman .................................. | 375/354 |
| 5,408,617 | 4/1995 | Yoshida .................................. | 395/325 |
| 5,408,661 | 4/1995 | Kuranaga ................................ | 395/650 |
| 5,418,953 | 5/1995 | Hunt et al. .............................. | 395/650 |
| 5,430,774 | 7/1995 | Dupuy ..................................... | 375/240 |
| 5,454,110 | 9/1995 | Kannan et al. .......................... | 395/700 |
| 5,465,364 | 11/1995 | Lathrop et al. .......................... | 395/700 |
| 5,471,471 | 11/1995 | Freeburg et al. ......................... | 370/79 |
| 5,485,460 | 1/1996 | Schrier et al. ........................... | 370/94.1 |
| 5,490,275 | 2/1996 | Sandvos et al. ......................... | 395/700 |
| 5,504,894 | 4/1996 | Ferguson et al. ....................... | 395/650 |
| 5,517,635 | 5/1996 | Cross et al. ............................. | 395/500 |
| 5,519,851 | 5/1996 | Bender et al. . | |
| 5,715,246 | 2/1998 | Abdesselem et al. .................. | 370/347 |

FOREIGN PATENT DOCUMENTS 0721289   7/1996   European Pat. Off. ......... H04Q 7/30

OTHER PUBLICATIONS

Siemens Product Overview Brochure09.95, entitled "ICs for Communications—Goldplus Chip Set", pp. 1–12.

*Primary Examiner*—Hassan Kizou
*Assistant Examiner*—Duc Ho
*Attorney, Agent, or Firm*—Dickstein Sharpiro Morin & Oshinsky LLP

[57]  ABSTRACT

A GSM transceiver unit (10), for use in a GSM network (84), having a multilayer portable protocol stack is disclosed. The multilayer protocol stack includes a hardware layer (204), a first portable layer (206) configuring the hardware layer and controlling communications to and from the hardware layer, and second and third portable layers (208) controlling communications to and from the first portable layer and utilizing the first portable layer for communications with the GSM network. The GSM transceiver unit (10) includes a dynamics description (202) containing at least one time delay with each time delay representing an integer multiple of a fixed time duration for a particular instruction to be scheduled and containing at least one time advance with each time advance representing an integer multiple of the fixed time duration for a particular instruction to be scheduled. The first portable layer has at least one scheduler (210, 212), with each scheduler being responsive to the dynamics description, for scheduling instructions in frames with each instruction being either delayed or advanced by the at least one scheduler by an integer multiple of the fixed time duration for that instruction contained in the dynamics description. The hardware includes at least one processor (34, 76) for executing code implementing the at least one scheduler.

20 Claims, 3 Drawing Sheets

Microfiche Appendix Included
(3 Microfiche, 200 Pages)

GSM TRANSCEIVER WITH PORTABLE PROTOCOL STACK

MICROFICHE APPENDIX

This specification includes a microfiche appendix (consisting of 3 sheets having a combined total of 200 frames) which is written in the "C" computer language having 194 pages. Pages A-2 through A-4 are an implementation of the GSM encoding and decoding subsystem dynamics description 202 which is a file containing hardware constants. Pages A-5 through A-33 are an implementation of a generic cyclic scheduler 210 and pages A-34 through A-55 are an implementation of a generic non-cyclic scheduler 212 both written in the "C" computer language which access the hardware constants of the subsystem dynamics description of pages A-2 through A-4 to schedule instructions in a GSM frame with timing constraints particular to a hardware design. Pages A-56 through A-190 are an implementation written in the "C" computer language of hardware specific drivers 204 which are used in association with the particular hardware constants of the subsystem dynamics description of pages A-2 through A-4. The microfiche appendix contains subject matter which is copyrighted. A limited license is granted to anyone who requires a copy of the code disclosed therein for purposes of understanding or analyzing the invention but no license is granted to make a copy for any other purpose including executing the code in any form or language with a processing device. The subsystem dynamics description of the microfiche appendix is used to direct the behavior of the cyclic and non-cyclic schedulers.

TECHNICAL FIELD

The present invention relates to GSM transceiving units and more particularly to portable multilayer protocol stacks for use in GSM transceivers having different hardware designs in which the portable multilayer protocol stack is adaptable to conform to different timing constraints of the different hardware designs without complete rewriting thereof.

BACKGROUND ART

The GSM communication system (global system for mobile communications) is a TDMA telecommunications system providing time multiplexed communications between mobile units and base stations contained in the GSM communication system. The GSM communication system, including transceiver units, is defined by published specifications which have been adopted over the years. The totality of the GSM published specifications are expressly incorporated by reference herein in their entirety.

The functionality of a GSM transceiver in the GSM communication system is defined by the aforementioned GSM specifications and includes a multilayer protocol stack containing software executed with a microprocessor. A first layer of the protocol stack interfaces with the hardware and controls communications to and from the second and third protocol layers. The second and third protocol layers control communications to and from the first layer and utilize services provided by the first protocol layer to communicate between the GSM network. The communications between the GSM network and GSM transceivers are time multiplexed into GSM frames. Each GSM frame has a fixed time duration and is divided into multiple segments each containing a plurality of bits all in accordance with the aforementioned published GSM specifications.

FIG. 1 illustrates a block diagram of a prior art transceiving unit which is disclosed in a catalog entitled "ICs for Communications" published by Siemens AG and identified as Product Overview 09.95. Standard functional notations are utilized to identify the functional elements in the block diagram of FIG. 1. Only a brief overview description of FIG. 1 will be given to describe the overall design of a GSM transceiver in which the present invention may be practiced and its relationship to a GSM network.

The GSM transceiver 10 is a double conversion heterodyne PM receiver with phase shifting circuitry for I/Q demodulation. Antenna 12 is connected through filter 14 to low noise amplifier 16 which is in turn connected to filter 18. The output of filter 18 is connected to mixer 20 which shifts the received signal down to an intermediate frequency. The output of mixer 20 is connected to filter 22 and the output of filter 22 is connected to amplifier 24. The output of amplifier 24 is connected to mixer 26 which shifts the signal to the baseband and produces I and Q components. The output of mixer 26 is connected to amplifiers 28 whose I and Q outputs are respectively connected to filters 30 having outputs applied to A to D converters 32. The outputs of the A to D converters 32 are connected to a digital signal processor 34 which includes filters 36 which are connected to the outputs of the A to D converters 32, a soft equalizer 38 which is connected to the output of the filters 36 and a speech and channel decoder 40. The output of the speech and channel decoder 40 is connected to filter 42 whose output is connected to D to A converter 44 whose output is applied to amplifier 46 which drives speaker 48 to provide audio to a user. Speech of the user is detected by microphone 50 which is connected to amplifier 52 having an output connected to A to D converter 54. The output of A to D converter 54 is connected to filter 56 having an output connected to speech and channel encoder 58. The outputs of speech and channel encoder 58 are connected to a GMSK encoder 60 having a pair of I and Q outputs which are applied to D to A converters 62 with the outputs thereof being connected to filters 64 which respectively output the I and Q signals. The I and Q signals are connected to mixers 66 which are driven by RFVCO 68 to convert the signal from the baseband to the RF band. The output of mixers 66 is connected to output stage 68'. The output of output state 68 is connected to filter 70. The output of filter 70 is connected to output amplifier 72 which is controlled by a power amplifier control 74 in the form of a D to A converter. Microprocessor 76 controls the overall system including the power amplifier control 74 and provides a system interface 77. The system interface 77 generates chip select signals, internal clock signals, GSM specific control and timing signals via programmable timers for programmable interrupts on timer values and provides a chip card interface to a SIM card 78. The interface 77 also provides connectivity to a keypad 80. The microprocessor 76 is connected to a E$^2$PROM 82, a flash memory 85, and RAM 86.

As illustrated, a GSM network 84, which is in accordance with GSM specifications including base stations and related switching architecture, transmits and receives communications between individual transceiver units 10 via RF transmission 87. The communications are time multiplexed into GSM frames each containing 8 time slots each containing multiple bits. Base stations (not illustrated) of the GSM network 84 each have an antenna 88 which transmits and receives the aforementioned time multiplexed GSM frames.

Each GSM transceiver, such as the unit 10 illustrated in FIG. 1 in accordance with the published GSM specifications, has a multilayer protocol stack including first, second and third layers. Instructions must be issued to the hardware to allow the hardware to perform in accordance with the published GSM specifications in the GSM frames with either a frame advance or a frame delay which is required to be an integer multiple of the time duration of a GSM frame. This permits designers of hardware for implementing GSM transceivers to provide for pipeline frame delays or frame advances in terms of an integer multiple of the time duration of a GSM frame between the protocol stack and the hardware which suit the design requirements of the hardware. The first three layers of the GSM protocol stack conforms to the overall OSI network model for providing a universal multi-layer protocol stack.

In order to provide the functionality of the first three layers of the multilayer protocol stack of the GSM specifications, substantial software is required. This software requires substantial time and effort to write and is complex. Furthermore, because of the diversity of the designs used by the numerous manufacturers of chipsets used in GSM transceivers, the software required to implement the first layer of the protocol stack of a GSM transceiver is uniquely suited to and developed for a particular chipset which prevents the protocol stack from being portable to other chipsets and therefore usable with other chipsets without substantial rewriting of the code contained therein. A need exists in the art for a mechanism to permit the first layer of the protocol stack in accordance with the GSM specifications to be utilized with hardware of diverse designs without requiring substantial rewriting of the software in compliance with the hardware timing requirements of the particular hardware to which the protocol stack is applied.

U.S. Pat. No. 5,265,252 discloses a device driver system having a core which manages specific functions performed by a plurality of I/O devices. An operating system interface is generic to different operating systems. Each operating system has a device driver interface which is unique to the operating system. A conversion program is layered between the core and the operating system for converting communications between the device driver interface of the operating system interface of the core.

FIG. 2 illustrates a block diagram of a GSM prior art multiple layer protocol stack 100 of the type utilized with a transceiver unit 10 of FIG. 1. The overall protocol stack 100, as illustrated, may be associated with hardware 102 which is represented by the hardware 10 of FIG. 1. Layers 2 and 3 identified by reference numeral 104 are well known and comply with the published GSM specifications including timing requirements. Layer 1, which is identified by reference numeral 106, is comprised of multiple software modules which exist in diverse implementations for performing the overall functions contained in the layer 1 block diagram.

Cyclic scheduler 108 takes a GSM channel configuration description from layer 3 and arranges for apropriate instructions to be given to the GSM encoding and decoding subsystem 102 at the required times in order for the required channel structure to be implemented. The channel configurations are described in GSM specifications 05.02, section 6.4. The cyclic scheduler 108 has software which is uniquely written for the particular GSM encoding and decoding subsystem 102 which prevents it from being portable and adaptable without substantial rewriting to be useful with other hardware configurations.

Non-cyclic scheduler 110 performs the task of scheduling instructions to be carried by out by layer 1 which do not occur on a cyclical basis. The scheduled instructions typically are requests from the layer 3 to deliver information about base stations other than the base station currently camped onto by the transceiver unit 10 which is controlled by the cyclical scheduler 108. The non-cyclical scheduler 110 finds idle GSM frames into which requests from the layer 3 can be placed without interfering with the ongoing work of the cyclic scheduler 108. The non-cyclic scheduler 110 has software which is uniquely written for the particular GSM encoding and decoding subsystem 102 which prevents it from being portable and adaptable without substantial rewriting to be useful with other hardware configurations.

Downlinked statistics and control 112 performs the task of monitoring the absolute radio frequency channel control number to determine the absolute power and reception quality as measured in accordance with GSM published specifications 05.08, chapter 8. The result is reported to the layer 3. Synchronization and MS carrier frequency are maintained as specified in GSM specifications 05.10, section 6.

Uplink control 114 functions to control the uplinked transmitted power of the MS on a frame by frame basis as ordered by the base station in accordance with published GSM specifications 05.08, section 4.7.

Layer 1 in prior art GSM transceivers 10 has specialized code which is unique to the associated particular hardware. This code typically has timing requirements for scheduling instructions which are unique to each hardware design. As a result, the programming for implementing layer 1 for use with any particular hardware configuration of a particular chipset has little or no portability (adaptability without great reprogramming effort) to other hardware configurations.

One of the reasons, as stated above, why the prior art layer 1 of the protocol stack is not applicable (portable) to different hardware designs is that the published GSM specifications only dictate that particular instructions are scheduled in the GSM frames in accordance with frame advances or frame delays which are an integer multiple of the fixed time duration of each frame. However, because of the pipeline processing delays associated with different hardware designs and because the published GSM specifications do not specify anything more than the frame delays or frame advances for scheduling instructions should be an integer multiple of the time duration of a GSM frame, each implementation of layer 1 has code written into it which specifies the particular frame advance or frame delay of scheduling different instructions in the GSM frames which is unique to the particular frame delays and frame advances dictated by the associated hardware. As a result, code implementing layer 1 for a particular hardware design does not have portability to other hardware designs because the pipeline frame delays and frame advances associated with communications between the hardware and the protocol stack are not fixed by the published GSM specifications.

A need exists in the art for portable GSM first, second and third protocol stack layers which may be utilized in different hardware designs without substantial rewriting of the code thereof.

DISCLOSURE OF INVENTION

The present invention is an improved GSM transceiver unit for use in a GSM network having a multilayer portable protocol stack which is adaptable to different hardware designs (processors, etc.) without substantial rewriting of the code thereof. In accordance with the invention, a generic cyclic scheduler and a generic non-cyclic scheduler are adaptable to diverse hardware without rewriting of the code therein. In accordance with the invention, a subsystem dynamics description, which is a header file containing hardware specific time constants specifying a particular integer multiple of the time duration of a GSM frame used for scheduling either frame advances or frame delays of particular instructions in a GSM frame, communicates with the generic portable cyclic scheduler and the generic portable non-cyclic scheduler to control execution of instructions by the schedulers with the correct frame advances and frame delays required by the timing requirements of a particular hardware design. The subsystem dynamics description contains at least one frame delay and at least one frame advance with each frame delay and each frame advance representing an integer multiple of the fixed time duration of a GSM frame for scheduling a particular instruction in one of the frames. As a result, the generic cyclic scheduler and non-cyclic scheduler are portable to other hardware designs by only varying the contents of the subsystem dynamics description to specify the hardware time constants for each type of hardware design as a specified frame delay or frame advance for scheduling each instruction in a GSM frame as an integer multiple of the time duration of a GSM frame. Each generic scheduler is responsive to the hardware time constants (an integer multiple of the time duration of a GSM frame) subsystem dynamics description for scheduling instructions in the frames with each instruction being either delayed or advanced by an integer multiple of the fixed duration for that instruction contained in the dynamics description. At least one processor (typically, a microprocessor and/or a digital signal processor) executes code implementing the at least one scheduler.

A hardware layer is provided between layer 1 of the protocol stack and the GSM encoding and decoding subsystem (system hardware, including at least one of the aforementioned processors). The hardware layer is comprised of hardware specific drivers which are written specifically to provide communications to and from the specific hardware which is being interfaced to the portable layers 1–3. Each driver is not portable (i.e. is not generic to all GSM transceivers) and must be written to satisfy the hardware communication requirements of each hardware design. The hardware layer controls communications between the hardware and portable layer 1. The portable layer 1 configures the hardware layer and controls communications to and from the hardware layer and the second and third portable layers.

The cyclic scheduler provides a channel configuration description from layer 3 to the hardware layer to implement a channel configuration specified by the GSM published specifications 05.02, section 6.4, under utilization of information obtained from the subsystem dynamics description and the non-cyclic scheduler schedules instructions to be executed by the hardware layer which do not occur on a cyclical basis, under utilization of information hardware specific time constants as an integer multiple of the time duration of a GSM frame for a particular instruction obtained from the dynamics description. The non-cyclic scheduler identifies segments in the frames into which the instructions may be placed without interfering with the cyclic scheduler, under utilization of information derived from the dynamics description.

As a result of the subsystem dynamics description being a file containing the required frame delay and frame advance hardware constants for scheduling of instructions into frames by both a cyclic scheduler and a non-cyclic scheduler for a particular hardware design having particular hardware specific timing requirements, generic scheduling software is provided in portable layer 1 which is applicable to diverse hardware designs. The subsystem dynamics description is varied to include scheduling hardware time constants in terms of integer multiples of a time duration of a frame for each instruction which satisfy the frame delays and frame advances associated with each hardware design. The time delays and advances are read by the cyclic and non-cyclic schedulers in the portable layer 1 such that each scheduler is responsive to the dynamics description to provide scheduling frame advances and frame delays which are an integer multiple of the fixed duration of each instruction contained in the subsystem dynamics description as executed in the cyclic and non-cyclic schedulers.

Diverse hardware constants each specifying a specified integer multiple of the fixed duration of a GSM frame for a different instruction to be scheduled are read from the subsystem dynamics description to support the functions of the cyclic scheduler and non-cyclic schedulers of the portable layer 1 for scheduling instructions in the frames. Consequently, the cyclic scheduler and non-cyclic schedulers are easily adapted to particular hardware designs without requiring a substantial rewriting of the code therein with only the subsystem dynamics description, including the hardware specific timing constants and the hardware specific drivers having to be rewritten, thus making the code of the cyclic scheduler and non-cyclic scheduler generic and portable.

BRIEF DESCRIPTION OF THE DRAWINGS

Like numbers identify like parts throughout the drawings.

BEST MODE FOR CARRYING OUT THE INVENTION

Figure 1:
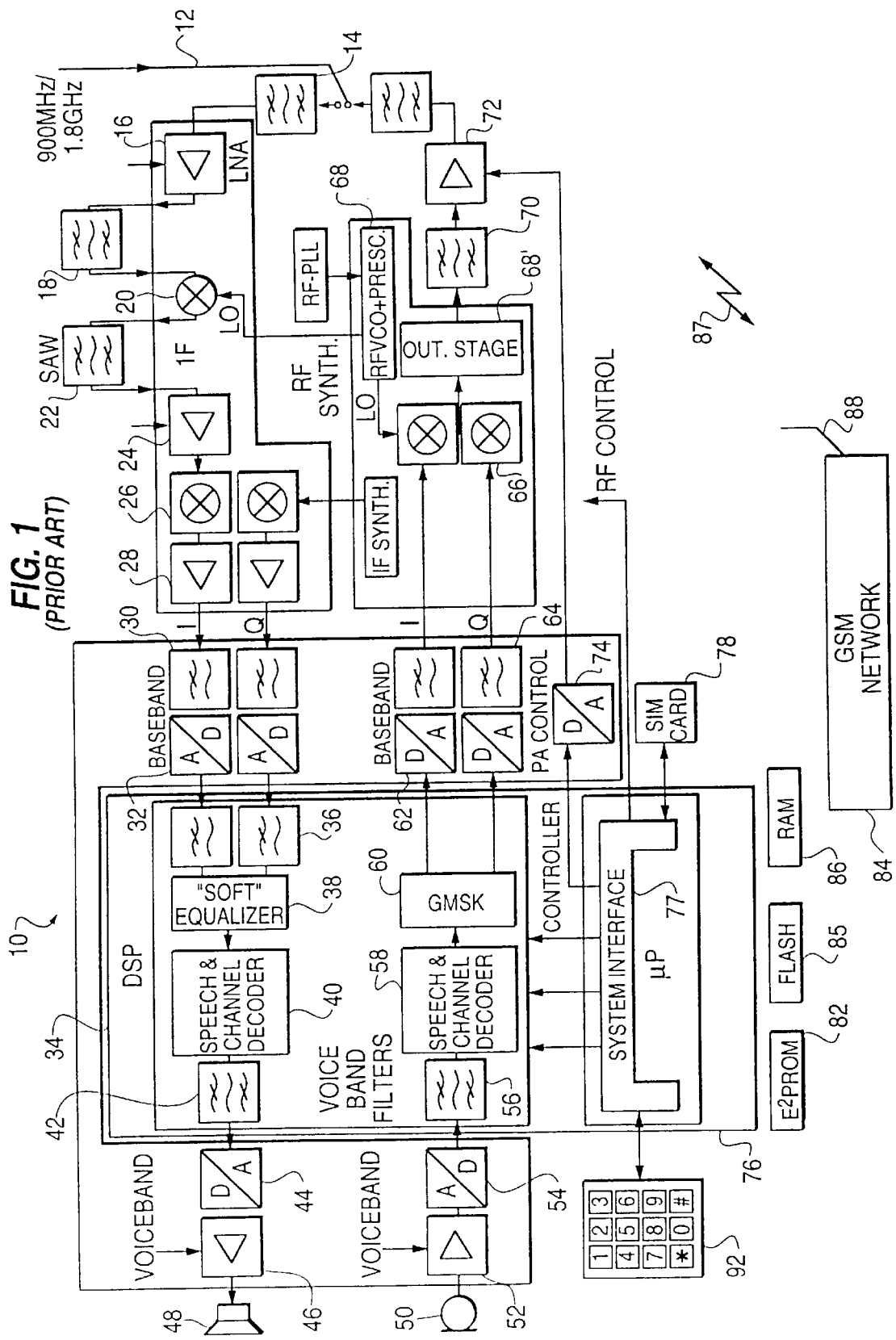
FIG. 1 is a block diagram of a GSM transceiver and network in accordance with the prior art.
Figure 2:
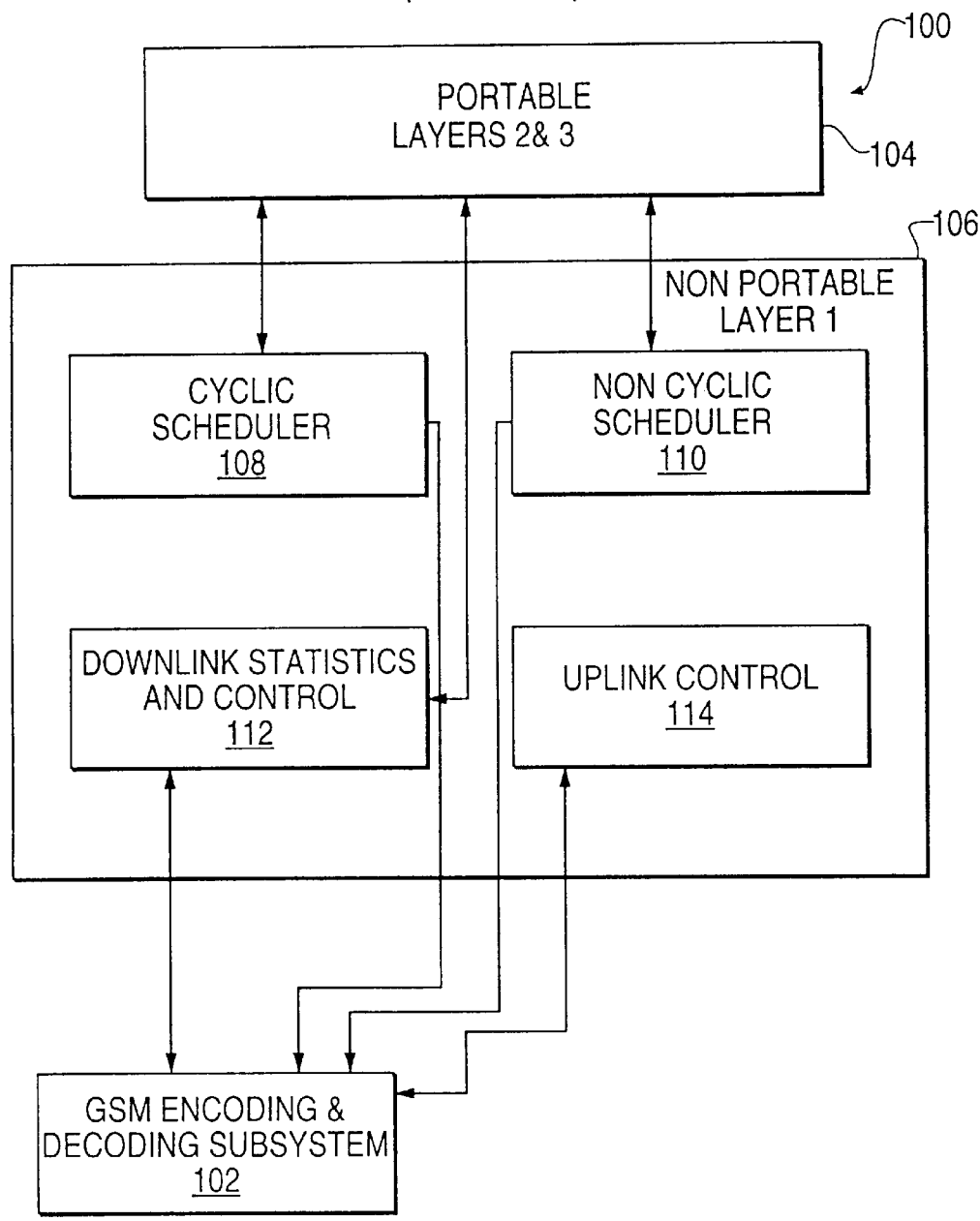
FIG. 2 is a block diagram of a GSM transceiver multiple layer protocol stack in accordance with the prior art.
Figure 3:
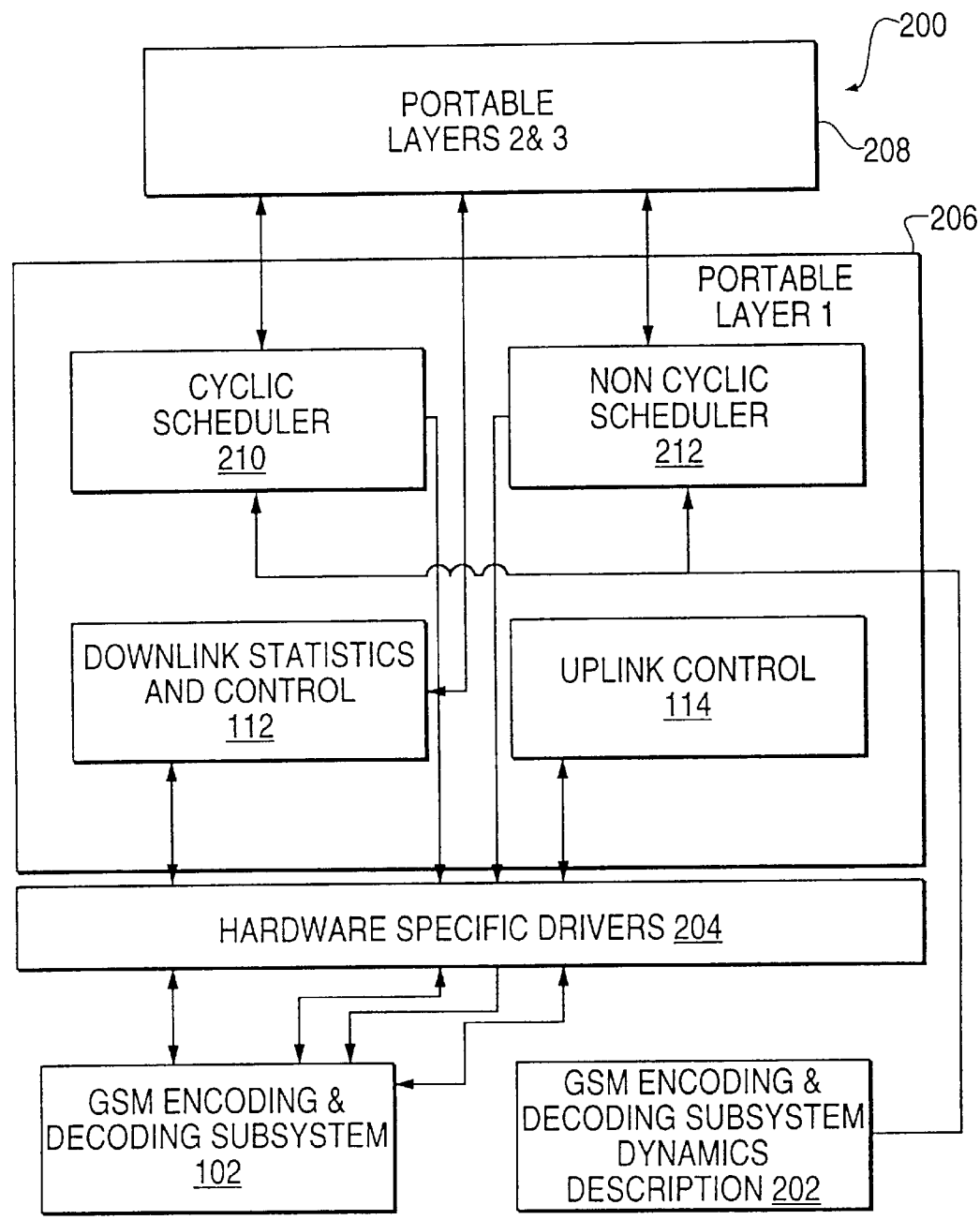
FIG. 3 is a block diagram of a GSM transceiver multiple layer protocol stack in accordance with the present invention.

FIG. 3 illustrates an embodiment 200 of a protocol stack for a GSM transceiver in accordance with the present invention. The embodiment 200 of FIG. 3 differs from the prior art of FIG. 2 in that in accordance with the invention a GSM encoding and decoding subsystem dynamics description 202 provides hardware time constants used for scheduling each instruction of the cyclic scheduler 210 and the non-cyclic scheduler 212 in frames to control the particular integer multiple of the fixed time duration of GSM frames which is assigned as either a frame delay or a frame advance for each instruction to be scheduled in one of the frames and further in that hardware specific drivers 204 are provided for interfacing between the specific hardware of the GSM encoding and decoding subsystem 102 and the portable layer 1. The rewriting of the dynamics description 202 and the hardware specific drivers 204 is all that is required to adapt the protocol stack to a different hardware design and requires substantially less effort than the rewriting of layers 1–3 of the prior art of FIG. 2. The generic cyclic scheduler 210 and the generic scheduler 212 and the downlink statistics control 112 and the uplink control 114 are generic to all hardware designs and do not require rewriting. The cyclic scheduler 210 and non-cyclic scheduler 212, instead of containing fixed code which is written specifically for a particular hardware configuration to be associated with the cyclic scheduler and non-cyclic scheduler, accesses the GSM encoding and decoding subsystem dynamics description 202 to obtain the hardware constants for particular instructions to be scheduled with an integer multiple of the fixed time duration of a frame which is assigned for scheduling a particular instruction in a frame as a frame delay or frame advance to make the software of the cyclic scheduler 210 and non-cyclic scheduler 212 generically operative in diverse hardware configurations having different frame advances or frame delays which are multiples of the GSM frame time interval.

The microfiche appendix contains an example of a GSM encoding and decoding subsystems dynamics description 202 written in a "C" code implementation which is a file containing the description of the hardware target system timing dynamics in terms of hardware time constants which are integer multiples of the time duration of a frame. The dynamics description 202 is used by the generic cyclic and non-cyclic schedulers 210 and 212 to set the particular frame advances and frame delays for the instruction set. The microfiche appendix also contains a generic cyclic scheduler 210 and a generic non-cyclic scheduler 212 written in the "C" computer language which communicates with the dynamics description 202 to obtain the hardware constants defined as frame advances and frame delays necessary for scheduling particular instructions in a GSM frame. Finally, an example of hardware specific drivers 204 used in association with the dynamics description 202 is contained in the microfiche appendix.

The following list briefly describes the hardware specific constants of pages A-2 through A-5 of the microfiche appendix which are used for a specific hardware design including a short explanation of their functionality. The integer at the end of each constant is the specification of the frame advance or frame delay expressed as an integer multiple of a time duration of a frame for one instruction.

HW_FRAME_ADV_CNTRL 1

This hardware constant specifies the number of frames rounded up to a whole integer from the earliest point in time at which the hardware drivers 204 may be called for a frame to the end of a transmit burst for that frame.

HW_FRAME_ADV_WRITE 1

This hardware constant specifies the number of frames that the HWWrite driver of the hardware drivers 204 will be called in advance of the call to the HWDo driver of the hardware drivers 204 handling the first frame of an uplink normal block.

HW_FRAME_ADV_WRITE_RACH 1

This hardware constant specifies the number of frames that the HWWrite driver of the hardware drivers 204 will be called in advance of the call to the HWDo driver of the hardware drivers 204 handling the first frame of single or repeated RACh bursts.

HW_FRAME_WAIT_READ 2

This hardware constant specifies the number of frames the HWGood and HWRead drivers of the hardware drivers 204 will be called after the call to the HWDo driver of the hardware drivers 204 handling the last frame of a downlink synchronous normal block.

HW_AFRAME_WAIT_READ (HW_FRAME_WAIT_READ+1)

This hardware constant specifies the number of frames the HWGood and HWRead drivers of the hardware drivers 204 will be called after the call to the HWDo driver of the hardware drivers 204 handling the last frame of a downlink asynchronous normal block.

HW_FRAME_WAIT_SCH_READ 4

This hardware constant specifies the number of frames the HWGood and HWRead drivers of the hardware drivers 204 will be called after the call to the HWDo driver of the hardware drivers 204 handling the SCh frame during an Sch grab in the scan, idle and SDCCh states.

HW_FRAME_WAIT_TCH_SCH_READ 3

This hardware constant specifies the number of frames the HWGood and HWRead drivers of the hardware drivers 204 will be called after the call to the HWDo driver of the hardware drivers 204 handling the Sch frame during an SCh grab in the idle frame on a TCh.

HW_FRAME_WAIT_TCH_FCCH_READ 2

This hardware constant specifies the number of frames the HWGood and HWRead drivers of the hardware drivers 204 will be called after the call to the HWDo driver of the hardware drivers 204 handling the FCCh search in the idle frame on a Tch.

HW_FRAME_WAIT_MONITOR 2

This hardware constant specifies the number of frames after calling the HWDo drivers of the hardware drivers 204 to handle any downlink synchronous frame, that the downlink statistics (power, sync, quality) will be available.

HW_FRAME_WAIT_SCAN 2

This hardware constant specifies the number of frames after the HWDo drivers of the hardware drivers 204 handling a downlink synchronous frame arranged for a neighboring cell measurement that the measured power on the neighbor will be available.

HW_AFRAME_WAIT_MONITOR (HW_FRAME_WAIT_MONITOR+1)

This hardware constant specifies the number of frames after calling the HWDO drivers of the hardware drivers 204 to handle any downlink asynchronous frame, that the downlink statistics (power) will be available.

HW_FRAME_WAIT_REPORT 3

This hardware constant specifies the number of frames after the end of a reporting period, that a monitoring list can be closed and a PHMonCnf is returned to RR.

HW_MAS_MONITOR_DEPTH 4

This hardware constant specifies the maximum of HW_FRAME_WAIT_MONITOR, HW_FRAME_WAIT_SCAN, HW_AFRAME_WAIT_MONITOR plus one.

HW_SCANS_PER_DOWN_FRAME 1

This hardware constant specifies the number of neighboring cells for which the power can be measured in one frame where only normal burst synchronous receive is performed.

HW_SCANS_PER_UP_FRAME 1

This hardware constant specifies the number of neighboring cells for which the power can be measured in one frame where only normal burst transmit is performed.

HW_SCANS_PER_FRAME 1

This hardware constant specifies the number of neighboring cells for which the power can be measured in one frame where only normal burst synchronous receive and transmit is performed.

HW_SCANS_PER_IDLE_FRAME 1

This hardware constant specifies the number of neighboring cells for which the power can be measured in one frame where neither transmit nor receive is performed.

HW_MAX_SCAN_CYCLES_FREQ 20

This hardware constant specifies during power scan, or idle scan, how many attempts will be made to tune the AGC on any ARFCN before giving up and not attempting to measure power on this ARFCN.

HW_FRAMES_SYNC_CHANGE 1

This hardware constant specifies the number of frames it takes for the synchronization to actually change after calling the HWTweakSync driver of the hardware drivers 204.

HW_NUM_FRAMERS 0

This hardware constant specifies how many private framers the HW drivers 204 need.

HW_SIZE_AGC_INFO 2

This hardware constant specifies the number of UINT8 needed to completely describe the AGC for any ARFCN.

HW_DENSE_FCCH_AGC 1

This hardware constant specifies the number of attempts made to tune the AGC before commencing a dense FCCh search in the idle and scan states.

HW_TCH_SCH_PERIODS 2

This hardware constant specifies the number of TCh idle frames the hardware needs to grab and decode an SCh while on a TCh.

HW_TCH_FCCH_FRAMES 3

This hardware constant specifies the driver 204 for FCCh search while on a TCh will first be called with the HWDoTCh driver of the hardware drivers 204 handling the TCh frame before the idle frame. This constant specifies for how many subsequent frames it should be called.

HW_TCH_SCH_FRAMES 3

This hardware constant specifies the driver 204 for SCh grab while on a TCh will first be called with the HWDoTCh driver of the hardware drivers 204 handling the TCh frame before the idle frame. This constant specifies for how many subsequent frames it should be called.

HW_SCANS_AFTER_SCH 1

This hardware constant specifies the frame following the idle frame on a SDCCh when a SCh is read of how many neighboring cell power measurements can be performed.

HW_DENSE_BSIC_FRAMES 32

This hardware constant specifies the worst case number of frames needed for a dense FCCh/SCh search. Max value is 32 as this is the longest free space on an SDCCh.

HW_DENSE_SCH_FRAMES 3

This hardware constant specifies how many frames needed to read and decode an asynchronous SCh in the scan, idle, and SDCCh states.

HW_QB_DIFF_FRAME_DELAY 5000

This hardware constant specifies when picking up asynchronous blocks i.e. BCCh and CBCh blocks, if a quarter bit delay is greater than this threshold the HWDo procedure will be called for the following frame instead.

HW_MAX_SCAN_STEPS_FRAME 20

This hardware constant specifies the maximum number of adequately measured scan elements that can be unlinked from the "to be done" scan list in the generic power scan, and idle power scan, without overloading the framer process.

HW_FCCH_ENTHUSIASM 3

This hardware constant specifies how many times to perform FCCh searches with frequency correction after a "reset PHScanReq" reset until giving up and declaring this ARFCN not be a CO ARFCN.

While the invention has been described in terms of its preferred embodiment, it should be understood that numerous modifications may be made thereto without departing from the spirit and scope of the invention as defined in the appended claims. For example, while a preferred embodiment of the invention is a multiple layer protocol stack in a GSM transceiver, the invention is also applicable to telecommunications units having diverse applications. A telecommunications unit in accordance with the invention may be without limitation a transmitter, receiver, transceiver or computer controlled device. It is intended that all such modifications fall within the scope of the appended claims.

I claim:

1. A GSM transceiver unit, for use in a GSM network, having a multilayer protocol stack including a hardware layer controlling communications to and from hardware, a first portable layer configuring the hardware layer and controlling communications to and from the hardware layer and second and third portable layers controlling communications to and from the first portable layer and utilize services provided by the first portable layer for communications with the GSM network, the communications with the GSM network being time multiplexed into frames each having a fixed time duration and with each frame being divided into multiple segments each containing a plurality of bits comprising:

a plurality of dynamics description parameters containing at least one frame delay with each frame delay representing an integer multiple of the fixed time duration for a particular instruction to be scheduled in one of the frames and containing at least one frame advance with each frame advance representing an integer multiple of the fixed time duration for a particular instruction to be scheduled in one of the frames;

the first portable layer having at least one scheduler, each scheduler being responsive to the dynamics description parameters, for scheduling instructions in the frames with each instruction being either delayed or advanced by the at least one scheduler by an integer multiple of the fixed time duration for that instruction contained in the dynamics description parameters; and the hardware including at least one processor for executing code implementing the at least one scheduler.

2. A GSM transceiver in accordance with claim 1 wherein:

the at least one scheduler comprises a cyclic scheduler and a non-cyclic scheduler.

3. A GSM transceiver in accordance with claim 2 wherein:

the cyclic scheduler provides a channel configuration description from the third portable layer to the hardware layer to implement a channel configuration specified by GSM published specification 05.02, section 6.4, utilizing information obtained from the dynamics description parameters.

4. A GSM transceiver in accordance with claim 2 wherein:

the non-cyclic scheduler schedules instructions to be executed by the hardware layer which do not occur on a cyclical basis utilizing information obtained from the dynamics description parameters.

5. A GSM transceiver in accordance with claim 4 wherein:

the non-cyclic scheduler identifies segments in the frames into which the instructions may be placed without interfering with the cyclic scheduler, utilizing information obtained from the dynamics description parameters.

6. A GSM transceiver unit, for use in a GSM network, having hardware and a multilayer protocol stack including a first portable layer controlling communications with the hardware and second and third portable layers controlling communications to and from the first portable layer and services provided by the first portable layer for communications with the GSM network, the communications with the GSM network being time multiplexed into frames each having a fixed time duration and with each frame being divided into multiple segments each containing a plurality of bits comprising:

a plurality of dynamics description parameters containing at least one frame delay with each frame delay representing an integer multiple of the fixed duration for a particular instruction to be scheduled in one of the frames and containing at least one frame advance with each frame advance representing an integer multiple of the fixed duration for a particular instruction to be scheduled in one of the frames;

the first portable layer having at least one scheduler, each scheduler being responsive to the dynamics description parameters, for scheduling instructions in the frames with each instruction being either delayed or advanced by the at least one scheduler by an integer multiple of the fixed duration for that instruction contained in the dynamics description parameters; and the hardware including at least one processor for executing code implementing the at least one scheduler.

7. A GSM transceiver in accordance with claim 6 wherein:

the at least one scheduler comprises a cyclic scheduler and a non-cyclic scheduler.

8. A GSM transceiver in accordance with claim 7 wherein:

the cyclic scheduler provides a channel configuration description from the third portable layer to the hardware layer to implement a channel configuration specified by GSM published specification 05.02, section 6.4, utilizing information obtained from the dynamics description parameters.

9. A GSM transceiver in accordance with claim 7 wherein:

the non-cyclic scheduler schedules instructions to be executed by the hardware layer which do not occur on a cyclical basis utilizing information obtained from the dynamics description parameters.

10. A GSM transceiver in accordance with claim 9 wherein:

the non-cyclic scheduler identifies segments in the frames into which the instructions may be placed without interfering with the cyclic scheduler utilizing information obtained from the dynamics description parameters.

11. A telecommunications unit, for use in a telecommunications network, having a multilayer protocol stack including a hardware layer controlling communications to and from hardware, a first portable layer configuring the hardware layer and controlling communications to and from the hardware layer and second and third portable layers controlling communications to and from the first portable layer and services provided by the first portable layer for communications with the telecommunications network, the communications with the telecommunications network being in frames each having a fixed time duration comprising:

a plurality of dynamics description parameters containing at least one frame delay with each frame delay representing an integer multiple of the fixed time duration for a particular instruction to be scheduled in one of the frames and/or containing at least one frame advance with each frame advance representing an integer multiple of the fixed time duration for a particular instruction to be scheduled in one of the frames;

the first portable layer having at least one scheduler, each scheduler being responsive to the dynamics description parameters, for scheduling instructions in the frames with each instruction being either delayed or advanced by the at least one scheduler by an integer multiple of the fixed time duration for that instruction contained in the dynamics description parameters; and the hardware including at least one processor for executing code implementing the at least one scheduler.

12. A telecommunications unit in accordance with claim 11 wherein:

the at least one scheduler comprises a cyclic scheduler and a non-cyclic scheduler.

13. A telecommunications unit in accordance with claim 12 wherein:

the cyclic scheduler provides a channel configuration description from the third portable layer to the hardware layer to implement a channel configuration utilizing information obtained from the dynamics description parameters.

14. A telecommunications unit in accordance with claim 12 wherein:

the non-cyclic scheduler schedules instructions to be executed by the hardware layer which do not occur on a cyclical basis utilizing information obtained from the dynamics description parameters.

15. A telecommunications unit in accordance with claim 14 wherein:

the non-cyclic scheduler identifies segments in the frames into which the instructions may be placed without interfering with the cyclic scheduler, utilizing information obtained from the dynamics description parameters.

16. A telecommunications unit for use in a telecommunications network, having hardware and a multilayer protocol stack including a first portable layer controlling communications with the hardware and second and third portable layers controlling communications to and from the first portable layer and services provided by the first portable layer for communications with the telecommunications network, the communications with the telecommunications network being in frames each having a fixed time duration comprising:

a plurality of dynamics description parameters containing at least one frame delay with each frame delay representing an integer multiple of the fixed duration for a particular instruction to be scheduled in one of the frames and/or containing at least one frame advance with each frame advance representing an integer multiple of the fixed duration for a particular instruction to be scheduled in one of the frames;

the first portable layer having at least one scheduler, each scheduler being responsive to the dynamics description parameters, for scheduling instructions in the frames with each instruction being either delayed or advanced by the at least one scheduler by an integer multiple of the fixed duration for that instruction contained in the dynamics description parameters; and the hardware including at least one processor for executing code implementing the at least one scheduler.

17. A telecommunications unit in accordance with claim 16 wherein:

the at least one scheduler comprises a cyclic scheduler and a non-cyclic scheduler.

18. A telecommunications unit in accordance with claim 17 wherein:

the cyclic scheduler provides a channel configuration description from the third portable layer to the hardware layer to implement a channel configuration utilizing information obtained from the dynamics description parameters.

19. A telecommunications unit in accordance with claim 17 wherein:

the non-cyclic scheduler schedules instructions to be executed by the hardware layer which do not occur on a cyclical basis utilizing information obtained from the dynamics description parameters.

20. A GSM transceiver in accordance with claim 19 wherein:

the non-cyclic scheduler identifies segments in the frames into which the instructions may be placed without interfering with the cyclic scheduler utilizing information obtained from the dynamics description parameters.

* * * * *